United States Patent Office 3,287,454
Patented Nov. 22, 1966

3,287,454
1-SUBSTITUTED 4-ISONICOTINOYLAMINO-PIPERAZINES
Calvin H. Lovell, Morton Grove, Ill., assignor to G. D. Searle & Co., Chicago, Ill., a corporation of Delaware
No Drawing. Filed Nov. 4, 1964, Ser. No. 408,729
5 Claims. (Cl. 260—268)

The present invention relates to a group of compounds which are 1-substituted 4-isonicotinoylaminopiperazines. More particularly, it relates to a group of compounds having the following general formula

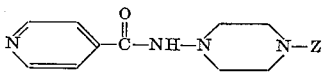

wherein Z is selected from the group consisting of methyl, phenyl, benzyl, and benzhydryl. Where the group Z contains an aromatic ring, this ring can be substituted with groups such as methyl, halogen, and methoxy. Such halogen substituents include fluorine, chlorine, bromine, and iodine. Some examples of Z which contain substituted aromatic groups are chlorophenyl, 4-methoxybenzyl, and 2-methylbenzhydryl.

The compounds of this invention are useful because of their pharmacological properties. In particular, these compounds are active as pepsin inhibitors. They also possess activity as appetite inhibitors, hypotensives, anti-atherogenic agents, and anti-inflammatory agents. Those compounds wherein Z is benzhydryl or substituted benzhydryl are particularly preferred compounds.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, oxalic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, dimethyl sulfate, and methyl benzenesulfonate.

The compounds of the present invention are prepared by the reaction of isonicotinoyl chloride, preferably as the hydrochloride, with an aminopiperazine of the formula

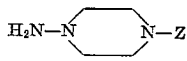

wherein Z is defined as above. The reaction is preferably carried out with heating in an inert solvent in the presence of a tertiary amine. Tertiary amines such as pyridine and triethylamine are particularly preferred and an excess of these materials can be used as the solvent for carrying out the reaction.

The following examples are presented to further illustrate the present invention; they should not be construed as limiting it in spirit or in scope. In these examples, quantities are indicated in parts by weight and temperatures in degrees centigrade (° C.).

Example 1

A solution is made up from 324 parts of 1-phenylpiperazine, 120 parts of glacial acetic acid and 400 parts of water and it is cooled to 10° C. The mixture is then stirred and cooled while a solution of 138 parts of sodium nitrite in 300 parts of water is added. A precipitate forms and the mixture is cooled to 5–10° C. With the addition of a mixture of 120 parts of glacial acetic acid and 300 parts of water to the cooled mixture, the precipitate disappears and then reappears. The mixture is then allowed to stand for 30 minutes and the precipitate is separated by filtration and washed with water. The solid is dissolved in a 50—50 mixture of ether and methylene chloride and this organic solution is washed first with water and then with dilute potassium carbonate solution. The organic solution is then dried over potassium carbonate, treated with charcoal, filtered, and concentrated to dryness under reduced pressure. An oil forms first but crystallizes on standing. The resultant solid is crystallized from a mixture of ether and hexane and then from 2-propanol to give 1-nitroso-4-phenylpiperazine melting at about 65–68° C.

A mixture is prepared from 30.4 parts of lithium aluminum hydride and 1400 parts of tetrahydrofuran and this solution is stirred under nitrogen while a solution of 106 parts of 1-nitroso-4-phenylpiperazine in 1120 parts of tetrahydrofuran is added. The mixture is stirred for 1 hour, refluxed for 4 hours, and then stirred at room temperature for 16 hours. The reaction mixture is then decomposed by the cautious dropwise addition of 32 parts of water in 210 parts of tetrahydrofuran followed by 24 parts of a 20% sodium hydroxide solution and then 112 parts of water. The mixture is filtered to remove the precipitate and the solvent is evaporated under reduced pressure. The residual oil is then distilled to give 1-amino-4-phenylpiperazine distilling at 125–130° C. at 1 mm. pressure.

Other aminopiperazines used at starting materials in the examples below are prepared according to the procedure described in detail in my copending application, Serial Number 387,765, filed August 5, 1964, now U.S. Patent No. 3,200,120 granted August 10, 1965.

Example 2

To a solution of 3.6 parts of isonicotinoyl chloride hydrochloride in 50 parts of anhydrous pyridine there is added 5 parts of 1-amino-4-benzhydrylpiperazine and the resultant mixture is heated on a steam bath for 2 hours. The pyridine solvent is removed from the reaction mixture under reduced pressure and the resultant residue is dissolved in dilute hydrochloric acid. The acid solution is made alkaline with excess potassium hydroxide solution and the solid which precipitates is separated by filtration and dried. The solid is then recrystallized from ethyl acetate to give 1-benzhydryl-4-isonicotinoylaminopiperazine melting at about 216–218° C.

This compound has the following formula

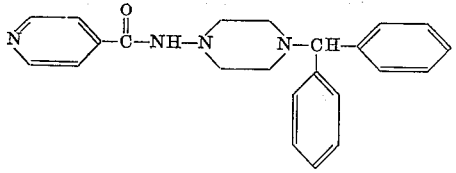

Example 3

11.5 parts of 1-amino-4-methylpiperazine is reacted with 17.8 parts of isonicotinoyl chloride hydrochloride in pyridine according to the procedure described in Example 2. The crude product is crystallized from ethyl acetate to give 1-methyl-4-isonicotinoylaminopiperazine melting at about 175–178° C. This compound has the following formula

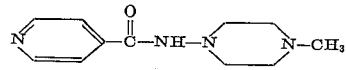

Example 4

A solution of 5 parts of 1-amino-4-(4-chlorobenzhydryl)piperazine in 50 parts of pyridine is added, with stirring, to a solution of 3 parts of isonicotinoyl chloride hydrochloride in 50 parts of anhydrous pyridine. The mixture is then heated at 60–70° C. for 4 hours and then allowed to stand for 16 hours. The pyridine solvent is removed from the mixture under reduced pressure and the residue is dissolved in dilute hydrochloric acid and then filtered to remove a small amount of insoluble material. The resultant solution is made alkaline and extracted with several portions of methylene chloride. The combined methylene chloride extracts are washed with water, dried over potassium carbonate, and filtered and the solvent is evaporated from the filtrate to leave a residual solid which is recrystallized from ethyl acetate. The product thus obtained is 1-(4-chlorobenzhydryl)-4-isonicotinoylaminopiperazine melting at about 177–182° C.

*Example 5*

5.6 parts of 1-amino-4-(2-methylbenzhydryl)-piperazine is reacted with 3.6 parts of isonicotinoyl chloride hydrochloride according to the procedure described in Example 4. The crude product is recrystallized from ethyl acetate to give 1-(2-methylbenzhydryl)-4-isonicotinoylaminopiperazine melting at about 168–172° C.

*Example 6*

A pyridine solution of 9.6 parts of 1-amino-4-benzylpiperazine and 8.9 parts of isonicotinoyl chloride hydrochloride is heated for 2 hours at 60–80° C. The pyridine is removed from the reaction mixture under reduced pressure and the resultant residue is disoslved in water and made alkaline with potassium hydroxide solution. The alkaline solution is extracted with methylene chloride and the resultant methylene chloride solution is dried and treated with charcoal. The solvent is removed from this solution under reduced pressure and the resultant residue is triturated with hexane. The solid which forms is separated and recrystallized from ethyl acetate to give 1-benzyl-4-isonicotinoylaminopiperazine melting at about 151–153° C. This compound has the following formula

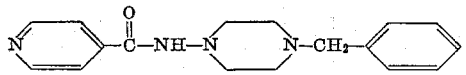

*Example 7*

To a suspension of 10 parts of isonicotinoyl chloride hydrochloride in 100 parts of anhydrous pyridine there is added a solution of 11.1 parts of 1-amino-4-(4-methoxybenzyl)piperazine in 50 parts of anhydrous pyridine. The resultant mixture is cooled to room temperature and allowed to stand for 48 hours. It is then heated at 60–80° C. for 1 hour before the pyridine solvent is removed under reduced pressure. The resultant residue is dissolved in water and the aqueous solution is made alkaline with potassium hydroxide solution. The alkaline solution is then extracted with methylene chloride and the organic extract is dried over potassium carbonate, treated with charcoal, and filtered. The solvent is evaporated from the filtrate and the resultant residue is triturated with hexane. The solid which precipitates is separated and recrystallized from ethyl acetate to give 1-(4-methoxybenzyl)-4-isonicotinoylaminopiperazine melting at about 146–148° C.

*Example 8*

The reaction of 8.9 parts of 1-amino-4-phenylpiperazine with 10 parts of isonicotinoyl cholride hydrochloride according to the procedure described in Example 7 gives a crude product which is recrystallized from 2-propanol to give 1-phenyl-4-isonicotinoylaminopiperazine melting at about 195–198° C. with decomposition.

What is claimed is:
1. A compound of the formula

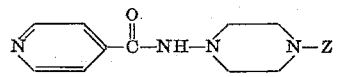

wherein Z is selected from the group consisting of methyl, phenyl,

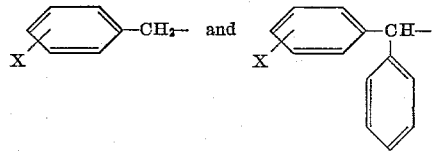

wherein X is selected from the group consisting of hydrogen, chlorine, methyl, and methoxy.
2. 1-methyl-4-isonicotinoylaminopiperazine.
3. 1-benzhydryl-4-isonicotinoylaminopiperazine.
4. 1-(4-chlorobenzhydryl)-4-isonicotinoylaminopiperazine.
5. 1-(2-methylbenzhydryl)-4-isonicotinoylaminopiperazine.

References Cited by the Examiner
UNITED STATES PATENTS
3,200,121   8/1965   Lovell _____ 260—268
FOREIGN PATENTS
722,627   1/1955   Great Britain.

ALEX MAZEL, *Primary Examiner.*
JAMES W. ADAMS, Jr., *Assistant Examiner.*

UNITED STATES PATENT OFFICE
CERTIFICATE OF CORRECTION

Patent No. 3,287,454　　　　　　　　　　　　　November 22, 1966

Calvin H. Lovell

It is hereby certified that error appears in the above numbered patent requiring correction and that the said Letters Patent should read as corrected below.

Column 4, after line 45, insert the following:

Reference Cited by Applicant
Erb-Debruyne, Annales de Chimie 9(1/2), 73 (1964).

Signed and sealed this 12th day of September 1967.

(SEAL)
Attest:

ERNEST W. SWIDER　　　　　　　　　　　　　EDWARD J. BRENNER
Attesting Officer　　　　　　　　　　　　　Commissioner of Patents